United States Patent [19]

Sun

[11] 4,240,993

[45] Dec. 23, 1980

[54] MULTI-LAYER FILM CONTAINING A LAYER OF CROSSLINKED ETHYLENE/VINYL ALCOHOL COPOLYMER

[75] Inventor: Joseph Z. Sun, Spartanburg, S.C.

[73] Assignee: W. R. Grace & Co., Duncan, S.C.

[21] Appl. No.: 931,635

[22] Filed: Aug. 7, 1978

[51] Int. Cl.$^3$ ............................................. B29C 25/00
[52] U.S. Cl. .................................. 264/22; 264/173; 264/185; 428/500; 428/520; 526/331
[58] Field of Search ............... 264/22, 25, 185, 171, 264/173; 428/520, 500; 526/331, 11; 425/462

[56] References Cited

U.S. PATENT DOCUMENTS

| | | | |
|---|---|---|---|
| 2,386,347 | 10/1945 | Roland | 526/11 |
| 2,877,500 | 3/1959 | Rainer et al. | 264/22 |
| 2,897,127 | 7/1959 | Miller | 204/154 |
| 2,941,973 | 6/1960 | Kumnick et al. | 260/30.6 |
| 3,082,194 | 3/1963 | Imperiale et al. | 526/8 |
| 3,419,654 | 12/1968 | Chiba et al. | 264/288 |
| 3,585,177 | 6/1971 | Gardner et al. | 526/331 |
| 3,620,435 | 11/1971 | Sogi | 264/22 |
| 3,734,843 | 5/1973 | Tubbs | 204/159.14 |
| 3,741,253 | 6/1973 | Brax et al. | 428/520 |
| 3,802,826 | 4/1974 | St. Eve | 425/462 |
| 3,865,665 | 2/1975 | Marion | 425/462 |
| 3,923,757 | 12/1975 | Salyer et al. | 526/8 |
| 3,957,941 | 5/1976 | Kawaguchi | 264/185 |
| 4,058,647 | 11/1977 | Inoue et al. | 428/500 |

FOREIGN PATENT DOCUMENTS 50-100194  8/1975  Japan .................................. 204/159.14

*Primary Examiner*—Jeffery R. Thurlow
*Attorney, Agent, or Firm*—John J. Toney; William D. Lee, Jr.

[57] ABSTRACT

A multi-layer film having a crosslinked layer of an olefin vinyl alcohol copolymer is produced by providing a substrate layer and a layer of a copolymer of an olefin and a vinyl ester. The multi-layer structure is crosslinked preferably by irradiation and then hydrolyzed to convert the olefin/vinyl ester copolymer into a copolymer of the olefin and vinyl alcohol. The thus produced structure may be incorporated into a further film combination by extrusion coating additional layers. The multi-layer structure may be oriented to produce a heat shrinkable film for use as a packaging material.

11 Claims, No Drawings

MULTI-LAYER FILM CONTAINING A LAYER OF CROSSLINKED ETHYLENE/VINYL ALCOHOL COPOLYMER

BACKGROUND OF THE INVENTION

This invention relates generally to the art of polymers and more particularly to the art of polymeric packaging film.

Polymeric films are ideally suited for packaging materials because of ease of fabrication thereof and because of the ability of some polymeric materials to maintain a packaged product in a desirable or unaffected condition. Particularly associated with the preservation of food articles is the ability of many polymeric films to resist the permeation of deleterious atmospheric gases into the contained product. One particular material which has been successful for packaging food articles is a copolymer of vinylidene chloride with one or more other monomers usually vinyl chloride. This copolymer is normally referred to commercially as saran. Saran has many characteristics, however, which make it a less than totally satisfactory packaging material. The chief disadvantage of saran is a difficulty associated with the forming of film products from resin melts.

A proposed replacement for saran as a commerical material possession resistance to oxygen permeation is the hydrolyzed product of ethylene and vinyl ester. Since the hydrolysis is normally greater than 96 percent complete, the hydrolysis is product is essentially a copolymer of ethylene and vinyl alcohol. Copolymers of ethylene and vinyl alcohol an processes for producing them are fully described in U.S. Pat. Nos. 2,386,347 and 3,585,177, herewith incorporated by reference. The process for forming such a composition into a film is described by C. H. Iba et al in U.S. Pat. No. 3,419,654 also herewith incorporated by reference.

Films composed of copolymers of ethylene of vinyl alcohol have been found to have a permeability to oxygen which is comparable to that of commercial saran while not possessing any halide moieties within the polymer structure.

A problem, however, with copolymers of ethylene and vinyl alcohol, while possessing excellent low oxygen permeability characteristics, is the effect that moisture has upon the desirable properties of the copolymer. Copolymers of ethylene and vinyl alcohol are soluble and thus swollen to some extent in water and are affected by moisture such that while retaining dimensional integrity the resistance to oxygen transmission is severely diminished. Thus any use of such copolymers for an application where low oxygen permeability is required must include measures to prevent moisture from coming into contact with the copolymer and must totally preclude the use of such copolymer in direct contact with a moisture bearing food article.

An additional problem with copolymers of ethylene and vinyl alcohol is that, while possessing low oxygen permeability, the material is extremely stiff having a high modulus of elasticity. This characteristic is rather irreconcilable with the deleterious effect which moisture has upon the oxygen transmission characteristics in that the layer of ethylene and vinyl alcohol copolymer is preferably made thick in order to offset the deleterious effects of moisture while desirably made thin in order to preserve flexibility. A thick layer does not possess the desirable flexibility required of packaging containers.

SUMMARY OF THE INVENTION

It is thus an object of this invention to provide a new multilayer packaging material having high resistance to oxygen permeation.

It is a further object of this invention to provide a new packaging material which possesses the desirable attributes of the prior art copolymer of ethylene and vinyl alcohol but which does not possess the undesirable characteristic of being deleteriously affected by moisture.

It is a still further object of this invention to provide a multi-layer packaging film having a relatively thin layer of a copolymer of ethylene and vinyl alcohol which is not deleteriously affected by moisture and which is sufficiently thin to provide flexibility to a packaging container.

These, as well as other objects, are accomplished by a multilayer film having a layer therein of a copolymer of an olefin and vinyl alcohol formed by crosslinking a copolymer of the olefin and a vinyl ester, crosslinking the vinyl ester copolymer to produce a crosslinked precursor and hydrolyzing the precursor to produce a crosslinked copolymer of an olefin and vinyl alcohol.

DETAILED DESCRIPTION

In accordance with this invention it has been found that a multi-layer film having a layer of a crosslinked copolymer of an olefin and vinyl alcohol possesses the beneficial and desirable characteristics of prior art copolymers of ethylene and vinyl alcohol, while simultaneously possessing a resistance to moisture such that the oxygen permeability characteristics are not adversely affected by contact with moisture and moisture containing articles.

The crosslinked layer of a copolymer of an olefin and vinyl alcohol is provided by initially crosslinking a copolymer of an olefin and a vinyl ester and by hydrolyzing the vinyl ester to produce a crosslinked copolymer of the olefin and vinyl alcohol. Olefins useful in this invention are the lower alpha mono-olefins, i.e., ethylene, propylene, butene-1 and butylene. While higher olefins might be utilized such higher olefins are deleteriously affected by radiation and are generally not preferred for use in this invention. While copolymers of olefins and vinyl esters are broadly the operable materials within this invention, the remaining description will be given with reference to copolymers of ethylene and vinyl esters, since ethylene is the preferred olefin for use within the invention. This, however, is not to be construed as limiting the invention to ethylene copolymers.

The precursor copolymer of ethylene or of another suitable olefin and vinyl ester is selected to preferably have a molar percentage of fifty percent for each constituent. The molar percentage, however, may actually vary within the range of about 10 to 90 mole percent for each constituent and remains within the scope of this invention. Copolymers of less than about 10 percent ethylene are difficult to form while those of greater than 90 percent are deficient in gas transmission properties. The preferred vinyl ester for utilization in the precursor copolymer is an ethylene/vinyl acetate copolymer. The vinyl ester, however, may be a vinyl ester of an aliphatic mono basic acid having from 1 to 8 carbon atoms. The precursor copolymer of ethylene and vinyl acetate is selected to preferably have a number average molecular weight above about 15,000.

The multi-layer film of this invention comprises a substrate layer and a crosslinked layer of a copolymer of ethylene and vinyl alcohol. The substrate layer is preferably also a layer which will crosslink but which will provide the required flexibility of a packaging film and thus permitting an extremely thin layer of the copolymer of ethylene and vinyl alcohol. Preferred polymers for the substrate layer which can be crosslinked by radiation are the polyolefins, particularly polyethylene and ethylene/vinyl acetate copolymers. When the ethylene vinyl acetate copolymer is used as the substrate layer in the present invention, the vinyl acetate content of the copolymer, if unblended, may be up to approximately 20 percent by weight with the preferred range being 3 to 12 percent by weight. The ethylene vinyl acetate copolymer may be blended with polyethylene to achieve an effective vinyl acetate content as desired.

The multi-layer film of this invention is produced by the process of this invention wherein a multi-layer structure is provided having a layer of substrate and a layer of a copolymer of ethylene and vinyl ester as a precursor layer. This multi-layer structure may be provided by conventional laminating or coating techniques but preferably is provided by coextrusion in tubular form. When utilizing coextrusion, the substrate layer is provided as the inner layer with the precursor layer as the outer layer. A coextrusion die which can perform such a process is shown in U.S. Pat. No. 3,802,826 which issued to Daniel R. St Eve on Apr. 9, 1974. A process of coextruding a flat film is shown in U.S. Pat. No. 3,865,665 which issued on Feb. 11, 1975 to George J. Marion.

The multi-layer structure is crosslinked by known techniques to crosslink preferably the substrate layer and the precursor layer. A substrate which does not crosslink when exposed to radiation, however, may also be used. The crosslinking reaction is carried out by techniques conventionally utilized from crosslinking copolymers of ethylene and vinyl esters such as the process described in U.S. Pat. No. 3,741,253 to Harri J. Brax et al and U.S. Pat. No. 2,877,500 to Rainer et al. Crosslinking is preferably accomplished by irradiation but may be accomplished utilizing peroxides as are well known in the art and as is further discussed below. The term "crosslinking" as utilized within this disclosure refers to the union of polymer molecules by a system involving primary chemical bonds to have the effect of binding a polymer molecule into a larger network so that it becomes functionally a part of a larger molecule. The precursor copolymer utilized in this invention is at least crosslinked so as to have one crosslink per weight average molecule. While the degree of crosslinking cannot be directly measured, the effect thereof is measured by solubility techniques.

Crosslinking by irradiation can be accomplished by various techniques. There can be utilized electrons, x-rays, and radiation of actinic origin such as ultra-violet light having a wave length above of 2,000 angstroms and below about 2,700 angstroms. Preferably, however, electrons of at least $10^5$ electron volts energy are applied for crosslinking the copolymer of ethylene and the vinyl ester as well as the substrate layer. The irradiation source can be a Van de Graff type electron accelerator having an operating voltage of about 2 megavolts at a power output of about 5 to 10 kilowatts. Preferably, however, the source of electrons is an electron accelerator powered by an insulated core transformer having an accelerating voltage from about 500 to about 3,000 kilovolts.

The adsorbed radiation within the material of interest is stated by the use of the term "RAD". The RAD is defined as the energy dosage level of 100 ergs per gram imparted by ionizing radiation to the irradiated material at the point of interest. The crosslinkable copolymer of ethylene and vinyl ester as well as the substrate layer will undergo crosslinking at a dosage within the range of from less than 1 to about 50 megarads. A dosage level significantly less than 1 megarad is not sufficient to produce the desired number of crosslinks per molecule unless some type of an irradiation crosslinking enhancer is utilized. A preferred dosage level is within the range of about 2 to about 8 megarads.

Crosslinking may alternatively, but less preferably, be brought about by utilizing chemical crosslinking agents. Such chemical crosslinking agents are well known in the art as is exemplified by U.S. Pat. No. 2,528,523 to Kent which is herewith incorporated by reference. When using chemical crosslinking agents, such as dicumyl peroxide, a film is initially formed and contacted by the crosslinking agents since after crosslinking the film or crosslinked material can no longer be melt formed into a film.

By the process of this invention the multi-layer structure comprising the crosslinked precursor is contacted on the precursor side with a reaction mixture for hydrolyzing the crosslinked precursor to form a crosslinked ethylene/vinyl alcohol copolymer. Preferably the reaction is carried out with an alcohol using an excess of sodium hydroxide to catalyze the hydrolysis reaction. This reaction is also referred to as a transesterification reaction on page 680 of *Organic Chemistry*, second edition, Morrison and Boyd, Boston 1966 which is herewith incorporated by reference. The hydrolysis reaction is also referred to within the art as saponification or alcoholysis. The crosslinked film is passed through a reaction vessel containing the reaction mixture in order to complete the formation of the polymer of ethylene and vinyl alcohol. Hydrolysis of the ethylene/vinyl ester copolymer is carried out by merely contacting the copolymer with the alcohol such as methanol, ethanol or isopropanol and an excess of catalyst such as alkali hydroxide or a mineral acid. The reaction may be carried out at room temperature but preferably a temperature of 30 to 100° C. is used in order to enchance the reaction rate. The hydrolysis may be partial or complete depending upon the catalyst and the time and temperature of reaction. The greater the percentage of vinyl ester in the copolymer, the more rapidly the rate of hydrolysis. Also alkali hydroxide catalyst give a more rapid rate of hydrolysis than mineral acid catalysts. For purposes of this invention it is desirable to carry the hydrolysis substantially to completion, i.e., greater than 96 percent.

The solubility of the ethylene vinyl ester copolymer within the reaction mixture will vary with vinyl ester content, degree of crosslinking, type of alcohol, and temperature. Higher vinyl ester contents as well as higher degrees of crosslinking correspond to lower solubility. The crosslinked precursor is less soluble in higher molecular weight alcohols than in lower molecular weight alcohols. The particular process parameters must be chosen to prevent significant dissolution of crosslinked precursor within the reaction mixture. For example, a low degree of crosslinking brought about by one MR of radiation would require the use of isopropyl alcohol while a 10 MR product may be contacted with ethanol without dissolution.

Upon completion of the hydrolysis reaction the multi-layer film may be oriented and otherwise fabricated in containers by known techniques. The multi-layer film may also additionally be coated with other desirable layers such as an additional layer of an ethylene vinyl acetate copolymer applied by the extrusion coating technique described in U.S. Pat. No. 3,741,253. Orientation may be carried out by the bubble technique or by the use of a tenter frame, prior to further fabrication into useful geometries such as containers.

It is thus seen that the process and product of this invention provide a multi-layer film having a thin layer of a crosslinked copolymer of ethylene and vinyl alcohol which is resistant to deleterious moisture effects and which is thin enough to provide the requisite flexibility of a packaging film. While many details of the invention are specified in the above description, such details are subject to wide variation within the scope of this invention as is measured by the following appended claims.

What is claimed is:

1. A process for producing a multi-layer film, comprising the steps of:
    providing a multi-layer structure having a substrate layer having a flexibility suitable for packaging material and a precursor layer of a copolymer of an olefin and a vinyl ester;
    crosslinking said precursor layer to produce a crosslinked precursor layer with at least one crosslink per weight average molecule;
    hydrolyzing said crosslinked precursor layer to produce a multi-layer film having a substrate layer and a copolymer layer of an olefin and vinyl alcohol.

2. The process according to claim 1 wherein said olefin is selected from the group consisting of ethylene, propylene, butene-1 and butylene.

3. The process according to claim 1 wherein said vinyl ester is a vinyl ester of an aliphatic mono basic acid having from 1 to 8 carbon atoms.

4. The process according to claim 3 wherein said vinyl ester is vinyl acetate.

5. The process according to claim 1 wherein said precursor copolymer is a copolymer of ethylene and vinyl acetate.

6. The process according to claim 1 wherein said step of providing is carried out by coextruding said substrate layer and said precursor layer in tubular form with said substrate layer on the interior of said tubular form.

7. The process according to claim 1 wherein said step of crosslinking is carried out by subjecting the precursor layer to radiation.

8. The process according to claim 7 wherein said step of hydrolyzing is carried out by contacting said crosslinked precursor with a primary alcohol and a cataylst.

9. The process according to claim 1 wherein said substrate layer is a polymer or copolymer of an olefin.

10. The process according to claim 9 wherein said olefin polymer or copolymer is simultaneously crosslinked with the crosslinking of said precursor layer.

11. The process according to claim 1 further comprising orienting said multilayer structure after said step of hydrolyzing.

* * * * *